United States Patent
Kim et al.

(10) Patent No.: US 9,385,349 B2
(45) Date of Patent: Jul. 5, 2016

(54) THIN FILM BATTERY PACKAGE

(75) Inventors: Soo Ho Kim, Incheon (KR); Sang-Cheol Nam, Seoul (KR); Yong Yeon Kim, Gwangmyeong-si (KR); Eun Hang Cho, Seoul (KR)

(73) Assignee: GS ENERGY CORPORATION, Seoul (KR)

( * ) Notice: Subject to any disclaimer, the term of this patent is extended or adjusted under 35 U.S.C. 154(b) by 245 days.

(21) Appl. No.: 13/992,635

(22) PCT Filed: Nov. 25, 2011

(86) PCT No.: PCT/KR2011/009092
§ 371 (c)(1),
(2), (4) Date: Jun. 7, 2013

(87) PCT Pub. No.: WO2012/077926
PCT Pub. Date: Jun. 14, 2012

(65) Prior Publication Data
US 2013/0280591 A1    Oct. 24, 2013

(30) Foreign Application Priority Data

Dec. 9, 2010 (KR) .......... 10-2010-0125475
Aug. 31, 2011 (KR) .......... 10-2011-0087889

(51) Int. Cl.
*H01M 2/02* (2006.01)
*H01M 2/10* (2006.01)
(Continued)

(52) U.S. Cl.
CPC .......... *H01M 2/0207* (2013.01); *H01M 2/0287* (2013.01); *H01M 2/1061* (2013.01); *H01M 10/052* (2013.01); *H01M 10/0562* (2013.01); *Y02E 60/122* (2013.01); *Y02P 70/54* (2015.11)

(58) Field of Classification Search
CPC ..................................... H01M 2/0207
See application file for complete search history.

(56) References Cited

U.S. PATENT DOCUMENTS

| | | | |
|---|---|---|---|
| 2004/0185336 A1 | 9/2004 | Ito et al. | |
| 2010/0330411 A1* | 12/2010 | Nam ............... | H01M 2/08 429/156 |
| 2012/0092809 A1 | 4/2012 | Tamachi et al. | |

FOREIGN PATENT DOCUMENTS

| | | |
|---|---|---|
| JP | 06231796 | 8/1994 |
| JP | 2002352850 A | 12/2002 |
| JP | 2004253287 A | 9/2004 |

(Continued)

OTHER PUBLICATIONS

International Search Report mailed Jun. 11, 2012 for PCT/KR2011/009092, citing the above reference(s).

(Continued)

*Primary Examiner* — Jane Rhee
(74) *Attorney, Agent, or Firm* — Hauptman Ham, LLP (57) ABSTRACT

A thin film battery package includes: a case having an open top side and defining a predetermined space therein, wherein the case has one side at which first and second electrodes formed of a metal material are exposed and electrically connected to the outside; a battery block on which a plurality of unit batteries are stacked so that the plurality of unit batteries is electrically connected between a first terminal and a second terminal, wherein the battery block is seated within the case so that the first and second terminals of the unit battery disposed at one end thereof are electrically connected to the first and second electrodes; and a cover sealed and coupled to the top surface of the case.

18 Claims, 7 Drawing Sheets

(51) Int. Cl.
*H01M 10/052* (2010.01)
*H01M 10/0562* (2010.01)

(56) References Cited

FOREIGN PATENT DOCUMENTS

| | | |
|---|---|---|
| JP | 2004273436 | 9/2004 |
| JP | 2007103129 | 4/2007 |
| JP | 2010118159 A | 5/2010 |
| JP | 2010206101 A | 9/2010 |
| JP | 2012104804 A | 5/2012 |
| KR | 20090113106 | 10/2009 |

OTHER PUBLICATIONS

Japanese Office Action dated Sep. 1, 2015 in connection with the counterpart Japanese Patent Application No. 2013-543091.

* cited by examiner

THIN FILM BATTERY PACKAGE

CROSS REFERENCE TO RELATED APPLICATION

This application claims the priority of Korean Patent Application No. 10-2010-0125475, filed on Dec. 09, 2010 and No. 10-2011-0087889 filed on Aug. 31, 2011 in the KIPO (Korean Intellectual Property Office). Further, this application is the National Phase application of International Application No. PCT/KR2011/009092 filed Nov. 25, 2011, which designates the United States and was published in Korean.

TECHNICAL FIELD

The present invention relates to a thin film battery package, and more particularly, to a thin film battery package, which includes a plurality of unit cells modularized and inserted into one case to maximize capacity of a thin film battery, and which is sealed from the outside, whereby components constituting a thin film battery are not influenced by an external environment, thereby improving durability and charge/discharge efficiency of the thin film battery.

BACKGROUND ART

With the development of electronic and information communication industries, individuals carry various kinds of personal digital assistants, office devices, and the like. Therefore, miniaturization of devices has been rapidly advanced in many fields including cellular phones, portable AV devices, portable OA devices, and the like.

However, the size of power sources is not decreased in proportion to the miniaturization and portability of electronic devices. Accordingly, there is an urgent need for lithium secondary batteries which have a compact structure while securing excellent performance with increased energy density.

On the other hand, existing lithium secondary batteries are basically composed of an active material, separators, a liquid electrolyte and a carbonous negative electrode. Existing lithium secondary batteries have restriction in miniaturization due to a complex structure thereof. In addition, it is difficult to fabricate a thin lithium secondary battery due to the use of a pouch, and there is a risk of explosion.

In order to overcome such problems of existing lithium secondary batteries, a thin film battery may include a first thin film, an electrolyte, a second thin film, and the like.

The thin film battery is formed by sequentially forming all of these solid components as films. In this case, the thin film battery may be fabricated to a thickness of a few tens of micrometers, thereby enabling miniaturization of the thin film battery. Also, since the thin film battery has no risk of explosion as compared with existing lithium secondary batteries, the thin film battery is stable and can be implemented as batteries having various patterns according to the shape of a mask.

In order to protect the first thin film, the electrolyte and the second thin film from the external environment, the thin film battery is covered with a protective film made of a material such as polymer, ceramic or metal. However, when the thin film battery is used under a general atmospheric environment or high-temperature atmosphere, micro-pinholes can be produced in the protective film during the formation of the protective film, or curing or deformation can occur in the protective film of a polymer material due to high temperature. Therefore, some components constituting the thin film battery can be exposed to the external environment due to deficiency of the protective film. When some components of the thin film battery are exposed to the external environment, durability and charge/discharge efficiency of the thin film battery can be significantly reduced.

Moreover, a conventional thin film battery composed of unit cells has a limited applicability as a power source for electronic devices due to low capacity.

DISCLOSURE

Technical Problem

It is an aspect of the present invention to provide a thin film battery package capable of completely protecting unit cells, which are main components of a thin film battery, from external environmental factors.

It is another aspect of the present invention to provide a thin film battery package capable of preventing short circuit in packaging of a thin film battery.

It is a further aspect of the present invention to provide a thin film battery package capable of preventing durability and charge/discharge efficiency of components constituting a thin film battery from being significantly deteriorated due to change in external environment or temperature.

It is yet another aspect of the present invention to provide a thin film battery package capable of being used as a power source for various electronic devices by increasing the capacity of a thin film battery.

Technical Solution

In accordance with one aspect of the invention, a thin film battery package includes: a case having an internal space open at a top side thereof, and including first and second electrodes made of metal and coupled thereto while penetrating the case to be electrically connected to an interior and an exterior of the case; a battery block formed by stacking a plurality of unit cells to be electrically connected to one another, the battery block being seated inside the case, a unit cell at one end of the battery block having a first terminal electrically connected to the first electrode and a second terminal electrically connected to the second electrode; and a cover sealingly coupled to the top side of the case.

In accordance with another aspect of the invention, a thin film battery package includes: a case having an internal space open at a top side thereof, and including first and second electrodes made of metal and coupled thereto while penetrating the case to be electrically connected to an interior and an exterior of the case; a unit cell seated inside the case and having a first terminal electrically connected to the first electrode and a second terminal electrically connected to the second electrode; and a cover sealingly coupled to the top side of the case.

In accordance with a further aspect of the invention, a thin film battery package includes: an insulating case having an internal space open at a top side thereof, and including first and second electrodes formed therein; a battery block formed by stacking a plurality of unit cells to be electrically connected to one another in the internal space, the battery block being electrically connected to the electrodes of the case, and having a first terminal electrically connected to the first electrode and a second terminal electrically connected to the second electrode; a metal support member placed at an upper end of the case; and a cover welded to a upper side of the support member to seal the internal space.

Advantageous Effects

According to embodiments of the present invention, unit cells constituting a thin film battery package is present in a sealed state, thereby enabling complete protection of the unit cells from an external environment, and particularly, from external impact or abrasion.

In addition, the unit cells are in a vacuum state or an inert gas-filled state, thereby enabling prevention of rapid deterioration in durability and charge/discharge efficiency of the thin film battery package.

Further, plural unit cells are stacked inside a single sealed case, whereby the capacity of the thin film battery package can be maximized, and the thin film battery package can be used as a power source for various electrical devices.

Furthermore, since the case is formed by sintering, the locations and shape of electrodes on the case can be variously modified, whereby the thin film battery package can be used as a power source for various electrical devices.

Also, Kovar alloy is formed at an upper end of the case, so that the case can be easily welded to a cover made of metal.

Further, it is possible to prevent contact between a metal surface in an internal space of the case and conductive paste coating layers electrically connecting the unit cells stacked inside the case, thereby preventing electrical short-circuit.

BEST MODE

Hereinafter, exemplary embodiments of the invention will be described in detail with reference to the accompanying drawings.

Figure 1:
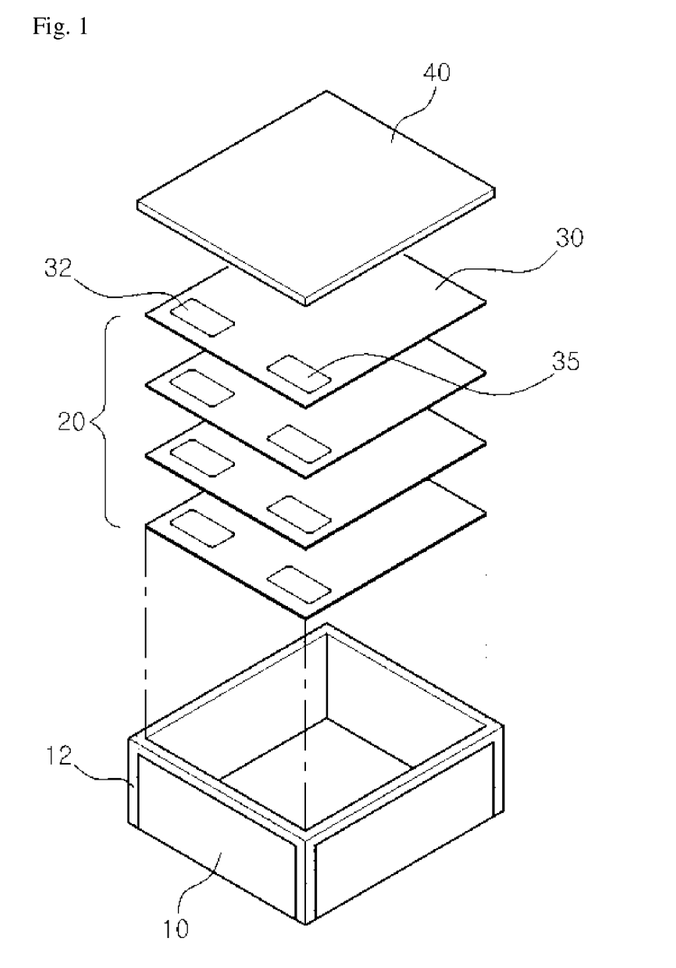
FIG. 1 is an exploded perspective view of a thin film battery package employing a support member according to one embodiment of the present invention.
Figure 2:
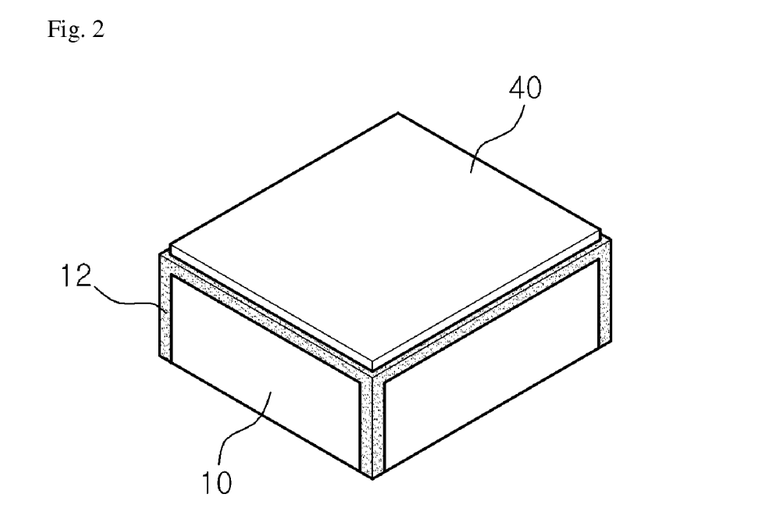
FIG. 2 is a perspective view of the thin film battery package of FIG. 1.
Figure 3:
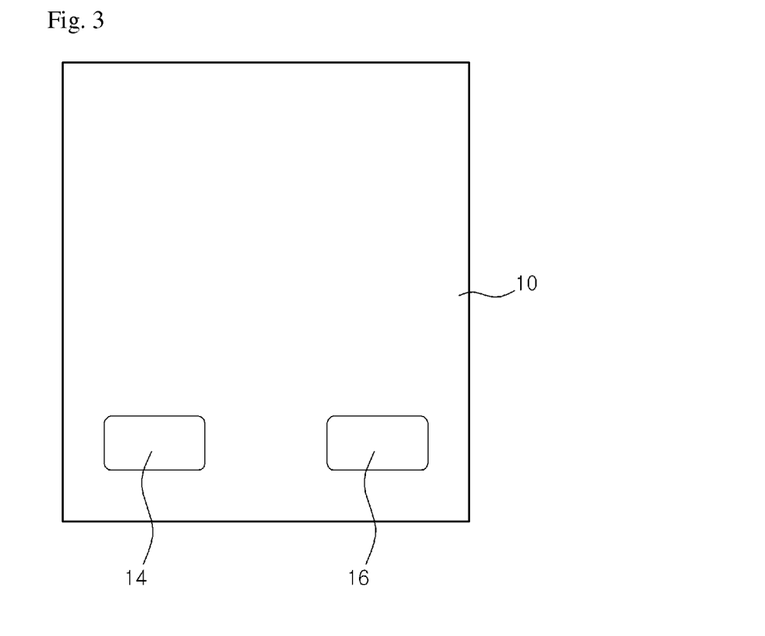
FIGS. 3 to 5 are plan views of various cases of the thin film battery package according to the embodiment of the present invention.
Figure 4:
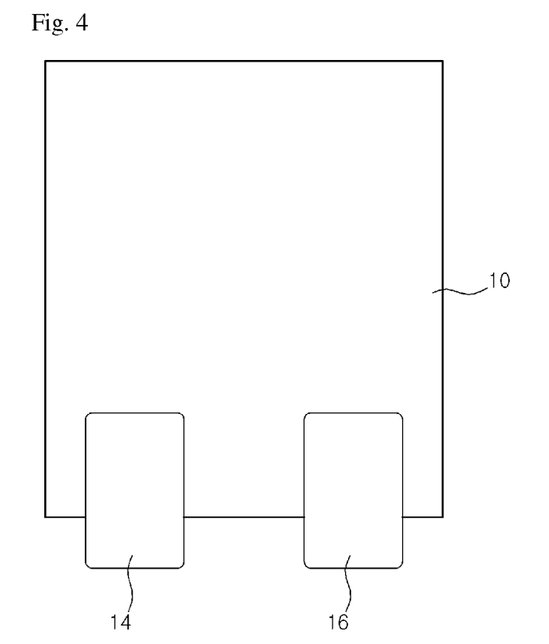
Figure 5:
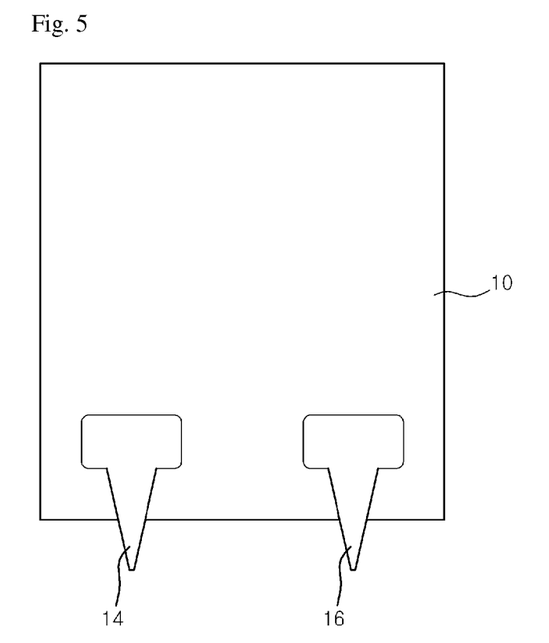
Figure 6:
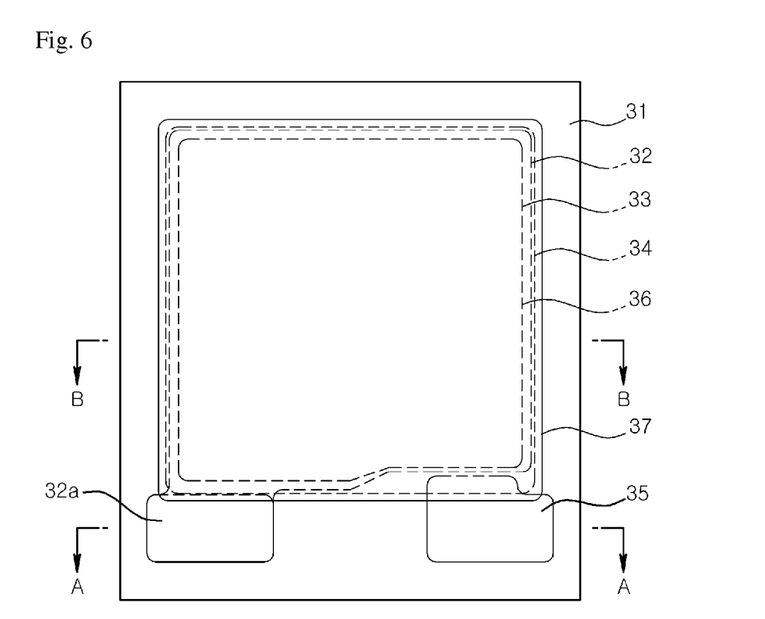
FIG. 6 is a plan view of a unit cell of the thin film battery package according to the embodiment of the present invention.
Figure 7:
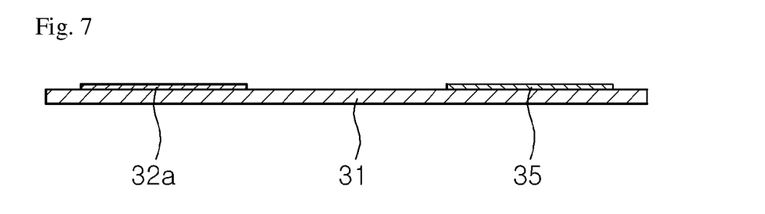
FIGS. 7 and 8 are sectional views taken along lines A-A and B-B of FIG. 6, respectively.
Figure 8:
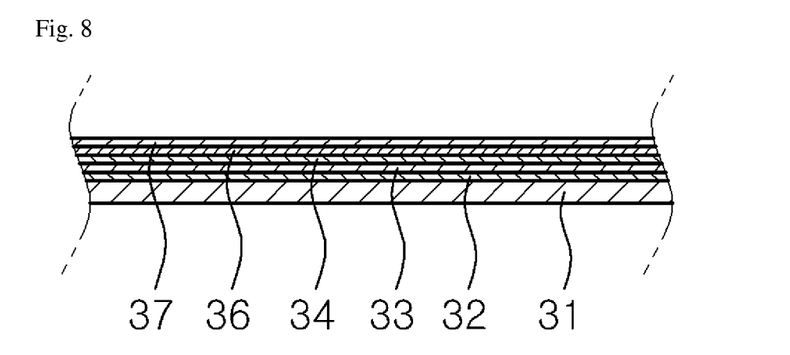

FIGS. 1 and 2 show a structure of a thin film battery package according to one embodiment of the invention. FIGS. 3 to 5 show various planar structures of a case in the thin film battery package according to the embodiment of the invention. FIG. 6 shows a planar structure of a unit cell in the thin film battery package according to the embodiment of the invention. FIGS. 7 and 8 show sectional structures taken along lines A-A and B-B of FIG. 6, respectively.

Referring to FIGS. 1 and 2, a thin film battery according to one embodiment includes a case 10, which has an open top side and defines a predetermined space therein, a battery block 20 formed by stacking a plurality of unit cells 30 and seated inside the case 10, and a cover 40 sealingly coupled to the top side of the case 10.

Referring to FIGS. 1 to 5, the case 10 is open at the top side thereof and has a predetermined space defined therein such that the battery block 20 can be seated in the case 10. First and second electrodes 14, 16 made of an electrically conductive metal are fixedly coupled to one side of the case 10, for example, to one surface thereof, to be electrically isolated from each other.

In this case, the first and second electrodes 14, 16 are coupled to the case 10 while penetrating the case 10 so as to be electrically connected to an interior and an exterior of the case 10. That is, the first and second electrodes 14, 16 coupled to the one side of the case 10 therethrough are partially exposed to the interior and exterior of the case 10, thereby being electrically connected to the internal unit cells and another external electronic device, respectively.

Although the case 10 may be made of various materials, such as glass, ceramic, polymer and metal, the case 10 is preferably made of a glass or ceramic material in consideration of strength, sinterability, insulation, etc.

For example, the case 10 may be formed by placing the first and second electrodes 14, 16 in glass or ceramic powder to be electrically isolated from each other, followed by sintering the glass or ceramic powder. In the case 10 prepared by a sintering process as described above, the locations and shapes of the electrodes 14, 16 may be changed in various ways. Thus, the thin film battery package may be used as a power source for various electronic devices.

A support member 12 is fixedly attached to corners and an upper edge of the case 10. In this case, the support member 12 may be made of a Kovar alloy containing Fe, Co and Ni as main elements.

The support member 12 extends along the upper edge of the case 10 and preferably extends downward along each corner from the upper edge.

Here, the support member 12 may be formed as a separate member, or may be integrally formed with the case 10.

The support member 12 strongly supports the corners of the case 10, and the case 10 made of ceramic and the support member 12 made of the Kovar alloy have a similar coefficient of thermal expansion. Thus, it is possible to prevent deformation of the case 10 due to high temperature or external impact.

In addition, the support member 12 made of the Kovar alloy is placed at the upper edge of the case 10, whereby the metallic cover 40 can be welded and coupled to the upper edge of the case 10.

In the battery block 20 seated inside the case 10, the plural unit cells 30 are stacked to be electrically connected to one another. Particularly, first terminals 32 of the respective unit cells 30 constituting the battery block 20 are electrically connected to one another, and second terminals 35 of the respective unit cells 30 are electrically connected to one another. A unit cell 30 disposed at one end of the battery block 20 has a first terminal 32 electrically connected to the first electrode 14 of the case 10, and a second terminal 35 electrically connected to the second electrode 16 of the case 10. Thus, the plurality of unit cells 30 constituting the battery block 20 can be electrically connected to an external electronic device through the electrodes 14, 16 of the case 10.

Each of the first and second electrodes 14, 16 of the case 10 may penetrate the case 10 and may be exposed to be electrically connected at one side thereof to the exterior of the case 10, as shown in FIG. 3. Alternatively, the first and second electrodes 14, 16 may penetrate the case 10 and have a pin or pad shape extending to the outside, as shown in FIG. 4 or 5.

Although the battery block 20, in which the plurality of unit cells 30 are stacked to be electrically connected to one another, has been described as being seated inside the case 10, one unit cell 30 instead of the battery block 20 may be seated inside the case 10. That is, one unit cell 30 including a first terminal 32 electrically connected to the first electrode 14 and a second terminal 35 electrically connected to the second electrode 16 is seated inside the case 10, and the cover 40 is then sealingly coupled to the top side of the case 10.

Referring to FIGS. 6, 7 and 8, the unit cell 30 according to the invention has a structure in which a first terminal 32, a first thin film 33, an electrolyte 34, a second terminal 35, a second thin film 36 and a protective film 37 are sequentially formed on a base substrate 31 in a predetermined order.

For example, the unit cell 30 may have a stacked structure of the base substrate 31 made of an insulating material, the first terminal 32 formed on the base substrate 31, the first thin film 33 formed on the first terminal 32 to be electrically connected thereto, the electrolyte 34 formed on the first thin film 33, the second terminal 35 disposed to be electrically isolated from the first terminal 32, the second thin film 36 formed on the electrolyte 34 to be electrically connected to the second terminal 35, and the protective film 37 for protecting each component of the unit cell 30 from the outside. Here, the first thin film 33 and the second thin film 36 may be a cathode and an anode, respectively, and vice versa.

The base substrate 31 may be made of various materials, such as glass, ceramic, polymers and metal, and has a thin plate structure.

The first terminal 32 may include an electrode 32a protruding from a partial section thereof. The first terminal 32 may be formed by depositing Pt, Au, W, Mo, Cr, Ni, ITO, Inconnel, Hastelloy, and the like on the base substrate 31.

The first thin film 33 has a relatively smaller area than the first terminal 32. The first thin film 33 is deposited in a range not beyond the first terminal 32. The first thin film 33 may be formed by depositing $LiCoO_2$, $LiMn_2O_4$, $LiNiO_2$, $LiFePO_4$, $LiNiVO_4$, $LiCoMnO_4$, $LiCo_{1/3}Ni_{1/3}Mn_{1/3}O_2$, $V_2O_5$, $MnO_2$, $MoO_3$, and the like on the first terminal 32.

To prevent short circuit between the first and second thin films 33 and 36, the electrolyte 34 may be formed to a sufficiently wide size to cover the overall thin film 33 and other portions excluding some of the protruding electrode 32a of the first terminal 32. The electrolyte 34 is formed by depositing $Li_2O$—$B_2O_3$, $Li_2$—$V_2O_5$—$SiO_2$, $Li_2SO_4$—$Li_2O$-$B_2O_3$, $Li_3PO_4$, LiPON, LiBON, and the like on the first thin film 33.

The second terminal 35 is separated from the first terminal 32 on the base substrate 31. Particularly, the second terminal 35 may be formed at a position corresponding to the protruding electrode 32a of the first terminal 32 at a predetermined interval. In this case, as long as the second terminal 35 is electrically isolated from the first terminal 32, the second terminal 35 may be formed at one side of the base substrate 31, which does not contact the electrolyte 34, or may be formed at the outside of the base substrate 31. The second terminal 35 is made of a material such as Ni, Cu, brass, Pt, Au, Cr, Ti, W, Mo or ITO.

The second terminal 36 is formed on the electrolyte 34 so as not to contact the first thin film 33 due to the electrolyte 34 interposed therebetween. In addition, the second thin film 36 partially overlaps the second terminal 35 so as to be electrically connected to the second terminal 35. The second thin film 36 is formed by depositing a material such as Li, $Sn_3N_4$, Si or Li-Me alloy on the electrolyte 34. The second thin film 36 may be disposed at another position except for the electrolyte 34 as long as the first and second thin films 33, 36 are electrically isolated from each other by the electrolyte 34.

The protective film 37 protects the components constituting the unit cell 30 from the outside. The protective film 37 is formed to a sufficient size to cover all of the first thin film 33, the electrolyte 34 and the second thin film 36. The protective film 37 may have a structure in which a planarized organic thin film layer, an inorganic thin film layer, a conformal organic thin film layer and an inorganic thin film layer are sequentially stacked.

Here, the planarized organic thin film layer functions to improve surface roughness by reducing defects of the components constituting the unit cell 30. The inorganic thin film layer is stacked on the planarized organic thin film layer to substantially serve as an oxygen and moisture barrier. The conformal organic thin film layer is stacked on the inorganic thin film layer so as to complement for non-uniform covering for particles, which is a disadvantage of the planarized organic thin film layer, and the inorganic thin film layer is stacked on the conformal organic thin film layer to substantially serve as an oxygen and moisture barrier.

The plurality of unit cells 30 constituting the battery block 20 may be electrically connected to one another by coating layers of a conductive paste formed on the terminals 32, 35. The plurality of unit cells 30 may be fixedly attached to one another by the coating layers of the conductive paste. That is, when the unit cells 30 are vertically stacked after the coating layers of the conductive paste are respectively formed to extend from the first and second terminals 32, 35 of each unit cell 30 to a side surface of the base substrate 31, the first terminals 32 of the unit cells 30 are electrically connected to one another by the coating layers of the conductive paste, and the second terminals 35 of the unit cells 30 are electrically connected to one another by the coating layers of the conductive paste.

The paste is at least one conductive epoxy of a one-solution type paste and a conductive paste.

The paste includes at least one of ITO, Ag, Pd and Ni, and may be either a one-solution type conductive paste or a two-solution type conductive paste.

The paste has a viscosity of 13,000 to 20,000.

Similarly, the first and second terminals 32, 35 of the individual unit cell 30 inside the case 10 or the unit cell 30 disposed at the one end of the battery block 20 are electrically connected to the respective first and second electrodes 14, 16 of the case 10 by the coating layers of the conductive paste extending from the first and second terminals 32, 35 of the unit cell 30 to the side surface of the base substrate 31. Thus, the battery block 20 may be fixedly attached to a bottom surface of the case 10 by the coating layers of the conductive paste.

The top side of the case 10 having the battery block 20 seated therein is sealed by the cover 40. Particularly, an internal space between the cover 40 and the case 10 having the battery block 20 therein may be in a vacuum state or in an inert gas-filled state. Here, the inert gas may include nitrogen, argon, etc.

For example, the battery block 20 is seated inside the case 10 so as to be electrically connected to the case 10, and an edge between the top side of the case 10 and the cover 40 is then sealed through local electric or laser welding. That is, local welding is performed between the cover 40 and the support member 12 made of the metal material, which is placed at the upper edge of the case 10, whereby the top side of the case 10 can be sealed by the cover 40.

In order to allow welding to be performed as described above, the entire cover 40 may be made of a metallic material, or only the edge of the cover 40, on which welding will be performed, may be made of the metal material. The center of the cover 40 may be made of various materials including glass ceramic, polymers, non-conductive metals, etc.

When the battery block 20 is sealed in a vacuum or in an inert atmospheric state, the unit cells 30 constituting the battery block 20 may be naturally protected from the external environment the case 10 and the cover. Further, external conditions and heat have no influence on the unit cells 30 constituting the battery block 20, thereby further improving charge/discharge efficiency of the thin film battery package.

When the battery block 20 is inserted into the internal space between the case 10 and the cover 40, a predetermined space can be formed between the battery block 20 and the cover 40, and cause the battery block 20 to move inside the case 10 instead of being closely coupled to the bottom surface of the case 40. In order to solve such a problem, fillers (not shown) may be provided between the battery block 20 and a lower surface of the cover 40 to bring the battery block 20 into close contact with the bottom surface of the case 10. In the case where one unit cell 30, instead of the battery block 20, is seated inside the case 10, the fillers are placed between the unit cell 30 and the lower surface of the cover 40. The fillers may include various materials such as polymers, synthetic resins, ceramics and metals. Preferably, the fillers are formed of a flexible film so as to secure a space for volume expansion in charge/discharge of the unit cell 30.

Fillers may be provided between the battery block and the bottom surface of the case. In this case, the filler may prevent the battery block from being moved by external impact.

Here, the fillers may be composed of any one of epoxy and polymer materials.

The fillers include epoxy for adhesion reinforcement, polymers, and silicone components for elasticity reinforcement.

Figure 9:
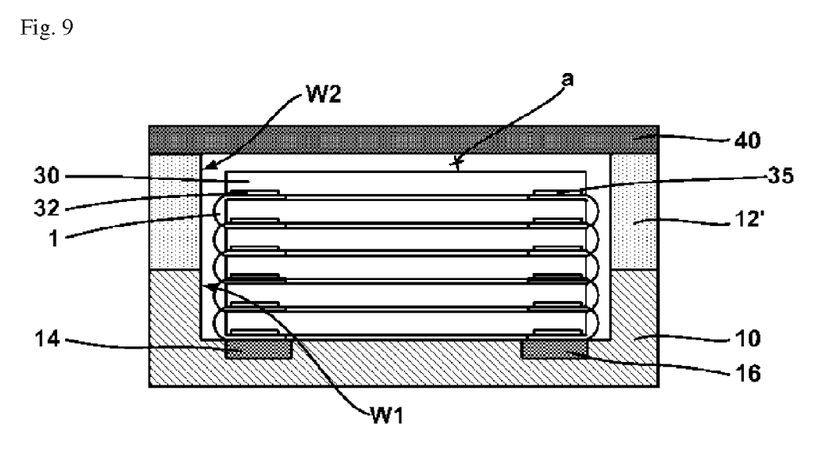
FIG. 9 is a sectional view of a thin film battery package employing a support member according to another embodiment of the present invention.

FIG. 9 shows a thin film battery package according to another embodiment, in which a support member is placed at an upper end of a case.

Referring to FIG. 9, a support member 12' made of metal is placed at the upper end of the case 10 according to the present invention. The case 10 is formed of an insulating ceramic material.

The support member 12' may include the Kovar alloy described above. Since Kovar alloys have a similar coefficient of thermal expansion to that of ceramics, it is easy to place the support member 12' at the upper end of the case 10 made of the ceramic material.

The support member 12' may be provided as a separate member at the upper end of the case 10, or may be integrally formed with the case 10. The support member 12' is placed to have a predetermined height on the upper end of the case 10.

The support member 12' may have the same area as that of the upper end of the case 10. That is, an inner surface W2 of the support member 12' surrounds a lateral side of the internal space 'a', and may be collinear with an inner wall W1 of the internal space 'a'.

A plurality of unit cells 30 is sequentially stacked in the internal space of the case 10 through the open top side of the case 10. The plurality of unit cells 30 is stacked in a direction parallel to the inner wall W2 of the internal space 'a'.

Here, the first and second terminals 32, 35 of each unit cell 30 are electrically connected to each other by coating layers 1 of a conductive paste deposited therebetween.

The first and second electrodes 14, 16 are formed at a lower portion of the internal space of the case 10. Here, the first and second terminals 32, 35 formed in the unit cell 30 independently contact the first and second electrodes 14, 16.

The conductive paste is applied to portions of the first and second terminals 32, 35 placed on the unit cell 30.

The conductive paste applied as described above allows the first and second terminals 32, 35 to be independently electrically connected to the first and second electrodes 14, 16 by moving downward along a side surface of the unit cell 30.

Then, a predetermined number of unit cells 30 are further stacked on the unit cell 30 so as to be electrically connected to one another. Here, electrical connection is obtained by depositing the conductive paste as described above.

Thus, the coating layers 1 of the conductive paste are formed on the side surfaces of the unit cells 30 stacked one above another. Each of the coating layers 1 of the conductive paste has a shape protruding toward the side surface of the unit cell and is formed in an inner wall direction of the internal space (or in a stacking direction of the unit cells 30).

The cover 40 may be placed at the upper end of the case 10 so as to cover the internal space 'a' of the case 10. In this case, a lower surface of the cover 40 may be in close contact with an upper side of the support member 12'.

Here, the cover 40 is formed of metal, and the support member 12' is formed of a Kovar alloy. Hence, the cover 40 and the support member 12' may be easily joined by welding. Here, the cover 40 may also be formed of a Kovar alloy.

The cover 40 is welded to the upper side of the support member 12', so that the internal space 'a' of the case 10, in which the unit cells 30 are stacked one above another, can be easily sealed from the outside of the case 10.

The aforementioned support member 12 or 12' may include at least one of Fe, Co and Ni.

The support member 12 or 12' may have a composition of 53% Fe, 17% Co and 30% Ni.

In addition, at least one of gold, copper and silver may be applied to an outer surface of the support member 12 or 12'.

Application may be performed through electroplating or electroless plating. This method is identically applied to a support member 12" described below.

When the conductive paste is excessively deposited between the unit cells 30, the coating layer 1 of the conductive paste can excessively protrude sideward between the unit cells 30.

In upper unit cells 30 surrounded by the support member 12' among the unit cells 30, the conductive paste coating layer 1 protruding sideward from the unit cells 30 may contact the inner surface of the metallic support member 12'.

In this case, the unit cells 30 are likely to suffer from short-circuit.

Thus, in some embodiments of the invention, the thin film battery package is configured to prevent contact between the inner surface of the support member 12' and the conductive paste coating layer 1 protruding sideward from the unit cells 30.

Figure 10:
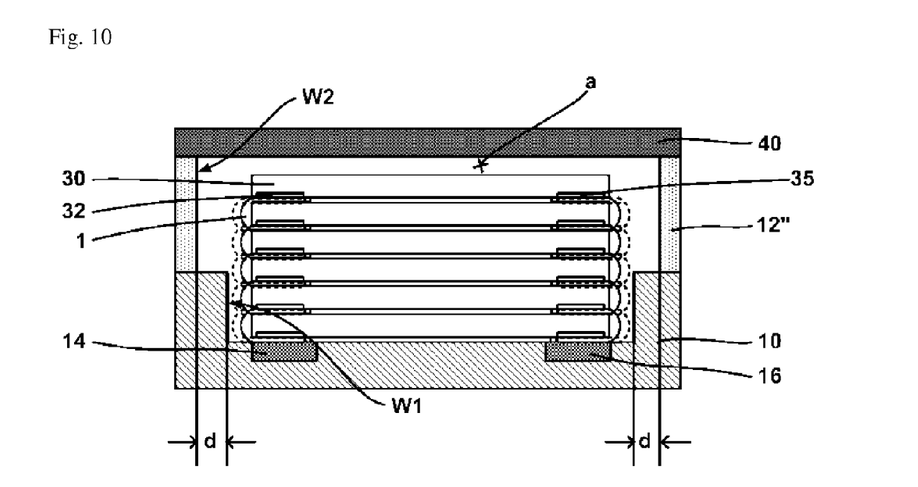
FIG. 10 is a sectional view of a thin film battery package employing a support member according to a further embodiment of the present invention.

FIG. 10 shows a thin film battery package which employs another embodiment of the cover according to the present invention.

Referring to FIG. 10, a support member 12" may be separately placed at an upper end of the case 10, or may be integrally formed with the case 10.

As described above, the support member 12" is placed to have a predetermined height on the upper end of the case 10.

An inner surface W2 of the support member 12" surrounds a lateral side of an internal space 'a'. The inner surface W2 of the support member 12" intersects an inner wall W1 of the internal space 'a'.

The inner surface W2 of the support member 12" is separated outward from the inner wall W1 of the internal space 'a' by a predetermined distance 'd'. The support member 12" has a narrower width than the case 10 beneath the support member 12".

In this configuration, when the conductive paste is excessively applied between the unit cells 30, the coating layer 1 of the conductive paste can excessively protrude sideward between the unit cells 30.

The coating layers 1 of the conductive paste protrude outward from side surfaces of upper unit cells 30 surrounded by the support member 12" among the unit cells 30.

In this case, the inner surface W2 of the support member 12" is separated a distance 'd' from the inner wall W1 of the internal space 'a', and thus, coating layers 1 of the conductive paste protruding sideward do contact the inner surface W2 of the support member 12".

Thus, in this invention, it is possible to prevent electrical short-circuit between the unit cells 30 and the metallic support member 12".

A welding method between the support member 12" made of the Kovar alloy and the metallic cover 40 is the same as that described with reference to FIG. 9.

The cover may be formed of a ceramic body. The support member may be coupled to an outer corner of the ceramic body.

Figure 11:
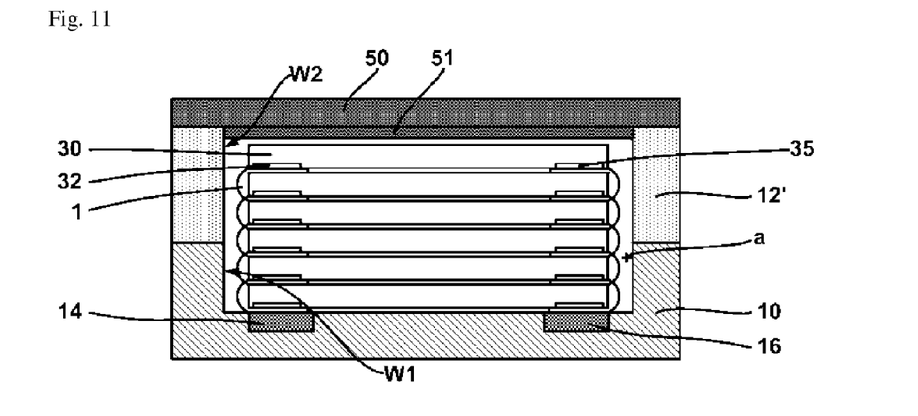
FIG. 11 is a sectional view of a thin film battery package employing a support member according to yet another embodiment of the present invention.

FIG. 11 shows a thin film battery package which employs a further embodiment of the cover according to the present invention.

Referring to FIG. 11, a metallic cover 50 may further include an auxiliary cover 51. The auxiliary cover 51 is a portion extending from a lower end of the cover 50.

The auxiliary cover 51 extends from the cover 50 to have a predetermined thickness so as to be inserted into an upper opening of an internal space 'a' of the case 10.

Thus, the auxiliary cover 51 is inserted into the upper opening of the internal space 'a' of the case 10, and a lower surface of the cover 50 outside the auxiliary cover 51 is in close contact with the upper end of the support member 12". The cover 50 and the support member 12" may be welded to each other.

When welding is performed, heat generated in the cover 50 can be transferred to the unit cells 30 in the internal space of the case 10. In this case, the unit cells 30 can be damaged due to high temperature upon welding.

Figure 12:
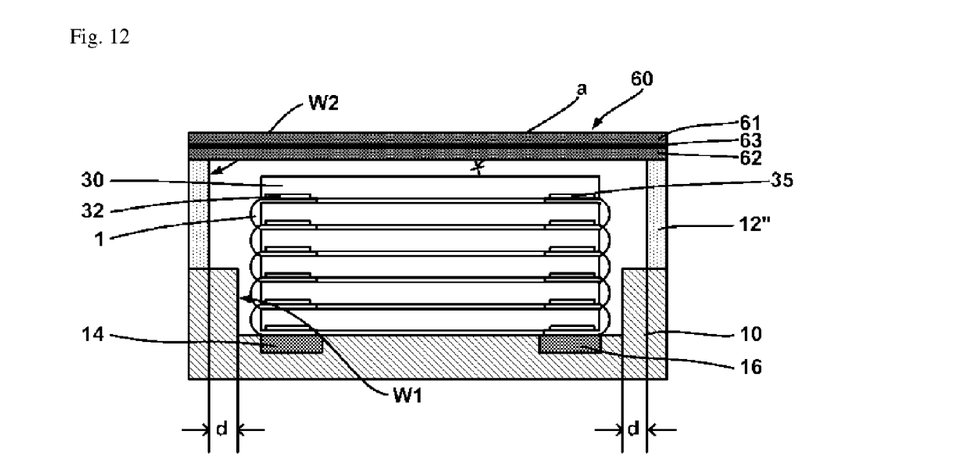
FIG. 12 is a sectional view of a thin film battery package employing a support member according to yet another embodiment of the present invention.

FIG. 12 shows a thin film battery package which employs yet another embodiment of the cover according to the present invention.

In the thin film battery package of FIG. 12, a cover 60 is capable of preventing thermal damage of unit cells 30.

The cover 50 having the auxiliary cover 51 and the cover 40 shown in FIGS. 1, 2, 9 and 10 are formed of metallic materials. The support member 12 or 12' welded to the cover 40 or 50 is formed of the Kovar alloy.

Referring to FIG. 12, the cover 60 according to the invention includes a pair of metal unit covers 61, 62 facing each other, and a heat shielding layer 63 formed between the pair of unit covers 61, 62.

The pair of unit covers 61, 62 includes first and second unit covers 61, 62 having different thicknesses.

The heat shielding layer 63 may be formed of a polyimide having good thermal resistance.

Here, the second unit cover 62 contacts the upper side of the support member 12".

The second unit cover 62 is thinner than the first unit cover 62.

The support member 12" and the second unit cover 62 may be welded to each other.

Heat generated during welding is transferred to the second unit cover 62, which is relatively thin, and the heat transferred to the internal space of the case 10 may be shielded by the heat shielding layer 63.

Hereinafter, a method for manufacturing the thin film battery package according to the embodiment of the present invention will be described.

Referring to FIG. 1, the method of manufacturing the thin film battery package according to the embodiment includes forming a case 10 having an open top side and defining a predetermined space therein, forming a battery block 20 by stacking a plurality of unit cells 30, seating the battery block 20 inside the case 10, and sealing and coupling a cover 40 to the top side of the case 10.

The case 10 is open at a top side thereof, and has a predetermined space defined therein such that the battery block 20 can be seated inside the case 10. First and second electrodes 14, 16 made of an electrically conductive metal are fixedly coupled to one side of the case 10, for example, to one surface thereof, to be electrically isolated from each other. In this case, the first and second electrodes 14, 16 may be exposed to the outside of the case 10 so as to be electrically connected to the case 10.

Although the case 10 may be made of various materials, such as glass, ceramic, polymer, and metal, the case 10 is preferably made of a glass or ceramic material in consideration of strength, sinterability, insulation properties, etc.

For example, the case 10 may be formed by placing the first and second electrodes 14, 16 in glass or ceramic powder to be electrically isolated from each other, followed by sintering the glass or ceramic powder.

A support member 12 is fixedly attached to corners and an upper edge of the case 10. In this case, the support member 12 may be made of a Kovar alloy containing Fe, Co and Ni as main elements. The support member 12 extends along the upper edge of the case 10, and preferably extends downward along each corner from the upper edge.

Next, the battery block 20 is prepared by stacking the plurality of unit cells 30 to be electrically connected between first and second terminals 32, 35.

The battery block 20 may be prepared by forming the plurality of unit cells 30, forming coating layers of a conductive paste on the first and second terminals 32, of each unit cell 30, and then stacking the unit cells 30 such that the first terminals 32 of the unit cells 30 can be electrically connected to one another, and the second terminals 35 of the unit cells 30 can be electrically connected to one another.

The battery block 20 is seated inside the case 10 so as to be electrically connected to the case 10. That is, the battery block 20 is seated inside the case 10 such that the first and second terminals 32, 35 of the unit cell 30 disposed at one end of the battery block 20 are electrically connected to the respective first and second electrodes 14, 16 of the case 10. Thus, the plurality of unit cells 30 constituting the battery block 20 can be electrically connected to an external electronic device through the electrodes 14, 16 of the case 10.

The unit cell 30 according to the invention may be formed by sequentially growing a first terminal 32, a first thin film 33, an electrolyte 34, a second terminal 35, a second thin film 36, and a protective film 37 in a predetermined order on a base substrate 31.

That is, the first terminal 32 has a structure in which an electrode 32a protrudes in a partial section on the base substrate 31. Then, the first thin film 33 made of a material electrically connected to the first terminal 32 is formed on the first terminal 32. In this case, the first thin film 33 is preferably disposed not to overlap with the protruding electrode 32a of the first terminal 32.

Then, the electrolyte 34 is formed on the first thin film 33. In this case, to prevent short circuit between the first and second thin films 33 and 36, the electrolyte 34 is preferably formed with a sufficiently wide size to cover the entire thin film 33 and the other portion except a portion of the protruding electrode 32a of the first terminal 32.

Then, the second terminal 35 is formed on the base substrate 31 or the electrolyte 34 to be electrically isolated from the protruding electrode 32a of the first terminal 32. Next, the second thin film 36 is formed on the electrolyte 34. In this case, the second thin film 36 partially overlaps with the second terminal 35 so as to be electrically connected to the second terminal 35 without contacting the first thin film 33 due to the electrolyte 34 interposed therebetween.

The protective film 37 for protecting the battery block 20 from the outside is formed on the second thin film 36. The protective film 37 may have a structure in which a planarized organic thin film layer, an inorganic thin film layer, a conformal organic thin film layer and an inorganic thin film layer are sequentially stacked.

The battery block 20 including the plurality of unit cells 30 is seated inside the case 10 so as to be electrically connected to the case 10, and a cover 40 is sealingly coupled to the top side of the case 10.

Here, an internal space between the case 10 and the cover 40 may be in a vacuum state or in an inert gas-filled state in the internal space.

The battery block 20 is seated inside the case 10, and an edge between the top side of the case 10 and the cover 40 is then sealed by electric or laser welding.

A support member 12 formed of a Kovar alloy is provided to the case 10. The support member 12 supports the case 10 by extending along the upper edge of the case 10 and extending downward along each corner from the upper edge.

An upper side of the support member 10 made of the Kovar alloy is in close contact with a lower surface of the metallic cover 40. In this case, since the support member 12 and the cover 40 are made of metallic materials, welding between the support member 12 and the cover 40 can be easily performed.

Thus, it is possible to easily seal the internal space in which the unit cells 30 are seated.

Referring to FIG. 9, a support member 12' may be placed at an upper end of the case 10. Here, the support member 12' may be stacked on the upper end of the case 10, or may be integrally formed with the upper end of the case 10.

An inner surface W2 of the support member 12' may be collinear with an inner wall W1 of the internal space 'a'.

Since the support member 12' and the cover 40 are made of metal, welding between the support member 12' and the cover 40 can be easily performed.

Referring to FIG. 10, a support member 12" may be formed such that an inner surface W2 of the support member 12' is separated a predetermined distance 'd' from an inner wall W1 of the internal space 'a'.

When coating layers 1 of a conductive paste protrude toward a side section of upper unit cells 30 surrounded by the support member 12" among the unit cells 30, the inner surface W2 of the support member 12" is separated a distance 'd' from the inner wall W1 of the internal space 'a', and hence the conductive paste coating layers 1 protruding sideward do not contact the inner surface W2 of the support member 12".

Thus, any risk of short-circuit between the unit cells 30 and the metallic support member 12" can be eliminated by design.

Referring to FIG. 11, an auxiliary cover 51 may be further formed on a lower surface of a cover 50.

Thus, the auxiliary cover 51 may be inserted into a upper opening of the internal space 'a' in which the unit cells 30 are seated, thereby improving the sealing performance of the internal space 'a'.

Referring to FIG. 12, a heat shielding layer 63 formed of polyimide having thermal resistance is formed in a cover 60.

Thus, it is possible to prevent heat generated in welding between the cover 60 and the support member 12" from being transferred to the internal space 'a', thereby easily protecting the unit cells 30 from thermal damage.

Figure 13:
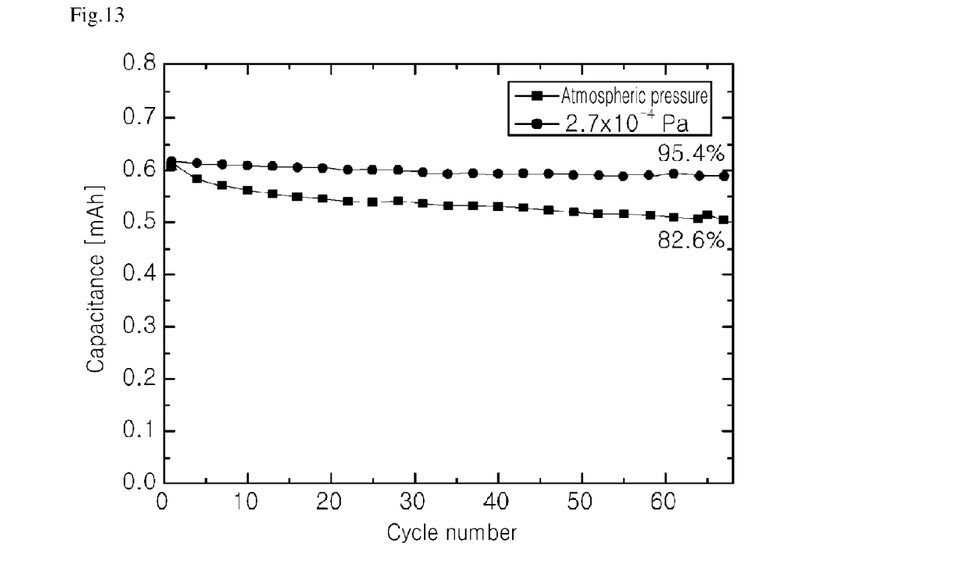
FIG. 13 is a graph depicting effects of a thin film battery package according to the present invention.

FIG. 13 is an experimental graph showing an effect of a thin film battery package according to the present invention.

A charge/discharge test was performed on the thin film battery package according to the invention, in which a plurality of unit cells 30 was vacuum-sealed, and a conventional thin film battery package in which a plurality of unit cells 30 was stacked in an unsealed state, under atmospheric pressure at 140° C. For the charge/discharge test, charge/discharge voltage was set to 3.8V to 4.1V, charge current was set to 1 C (0.6 mA), and discharge current was set to 2 C (1.2 mA).

As a result of the charge/discharge test under the conditions described above, it can be seen from FIG. 13 that the capacity of the vacuum-sealed thin film battery package according to the invention was 95.4% of an initial capacity and was much higher than the capacity of the conventional unsealed thin film battery package after 68 cycles that was 82.6% of an initial capacity thereof.

In addition, evaluation results of the gas transmission rate of the thin film battery package according to the invention are shown in Table 1.

TABLE 1

| | Gas Transmission Rate |
|---|---|
| Experimental Example (Ceramic Package) | $3.1 \times 10^{-8}$ atm cc/sec |
| Comparative Example 1 (Epoxy Package) | $2.5 \times 10^{-5}$ ata cc/sec |

The thin film battery package according to the present invention may have a gas transmission rate ranging from $5 \times 10^{-7}$ atmcc/sec to $10^{-9}$ atmcc/sec.

In the present invention, the case is made of an insulating material such as ceramic, the support member is made of a Kovar alloy, and the cover is made of metal or ceramic.

Thus, the present invention provides a thin film battery package through welding and coupling between ceramic and metal.

In the present invention, there are provided results obtained by performing an experiment of estimating shielding and preserving characteristics, using the thin film battery package.

<Comparative Experiment>

First, one packaged battery block was loaded into a pressure chamber made of metal.

Then, the pressure chamber was completely hermetically sealed.

Subsequently, 99.9% pure helium gas was injected into the pressure chamber until the pressure of the pressure chamber reached 4 kg/cm$^2$, and this state was maintained for two hours.

Then, the helium gas filled in the pressure chamber was released by opening a separate valve.

Subsequently, the pressure chamber was opened, and the packaged battery block was unloaded from the pressure chamber.

Then, the battery block was subjected to blowing with nitrogen gas for five minutes.

Subsequently, the leakage amount of helium gas was measured by loading the battery block into a chamber having a helium detector mounted therein.

Referring to FIG. 11, as a result obtained by the experimental procedure, the leakage amount of the helium gas was found to be $3.1 \times 10^{-8}$ atm cc/sec in Experimental Example 1, and the leakage amount of the helium gas was found to be $2.5 \times 10^{-5}$ atm cc/sec in Comparative Example 1.

In Experimental Example 1, a test was performed according to the procedure described above by stacking five batteries inside a ceramic package measuring $10 \times 7 \times 1.2$ mm$^3$ and welding metal and ceramic under an Ar atmosphere.

In Comparative Example 1, a test was performed according to the procedure described above by stacking five batteries and encapsulating the batteries with epoxy.

Accordingly, it can be seen that the gas transmission rate in Experimental Example 1 was lower than that in Comparative Example 1.

In the present invention, it is possible to provide shielding and preserving characteristics of the package through ceramic-metal welding as in Experimental Example 1.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A thin film battery package, comprising:
   a case comprising:
      an internal space open at a top side of the case; and
      first and second electrodes comprising metal and coupled to the case while penetrating the case,
      wherein the first and second electrodes are configured to be electrically connected between an interior and an exterior of the case;
   a battery block comprising:
      a plurality of stacked unit cells electrically connected to one another, the battery block being seated inside the case, a unit cell at one end of the battery block comprising a first terminal electrically connected to the first electrode and a second terminal electrically connected to the second electrode; and
   a cover sealingly coupled to the top side of the case,
   wherein each of the first and second electrodes comprises a portion which penetrates the case and extends to the exterior of the case, and
   wherein the internal space between the case and the cover includes vacuum, or is filled with an inert gas.

2. A thin film battery package, comprising:
   a case comprising:
      an internal space open at a top side of the case; and
      first and second electrodes comprising metal and coupled to the case while penetrating the case,
      wherein the first and second electrodes are configured to be electrically connected between an interior and an exterior of the case;
   a unit cell seated inside the case and having a first terminal electrically connected to the first electrode and a second terminal electrically connected to the second electrode; and
   a cover sealingly coupled to the top side of the case,
   wherein each of the first and second electrodes comprises a portion which penetrates the case and extends to the exterior of the case, and
   wherein the internal space between the case and the cover includes vacuum, or is filled with an inert gas.

3. A thin film battery package, comprising:
   an insulating case comprising:
      an internal space open at a top side of the insulating case; and
      first and second electrodes;
   a battery block comprising:
      a plurality of stacked unit cells electrically connected to one another in the internal space, the battery block being electrically connected to the electrodes, the battery block comprising a first terminal electrically connected to the first electrode and a second terminal electrically connected to the second electrode;
   a metal support member placed at an upper end of the case; and
   a cover welded to a upper side of the support member to seal the internal space,
   wherein each of the first and second electrodes comprises a portion which penetrates the case and extends to the exterior of the case, and
   wherein the internal space between the case and the cover includes vacuum, or is filled with an inert gas.

4. The thin film battery package according to claim 3, wherein an inner surface of the support member is collinear with an inner wall of the internal space.

5. The thin film battery package according to claim 3, wherein the support member is stepped toward an outside of the internal space.

6. The thin film battery package according to claim 3, wherein the support member is formed of a Kovar alloy.

7. The thin film battery package according to claim 3, wherein the cover includes a pair of unit covers facing each other and a heat shielding layer formed between the pair of unit covers.

8. The thin film battery package according to claim 3, wherein the cover further includes an auxiliary cover extending from a lower end of the cover by a predetermined thickness to be inserted into an opening of the internal space.

9. The thin film battery package according to claim 3, wherein the first and second electrodes have a pin or pad shape which penetrates the case and extends to the outside.

10. The thin film battery package according to claim 3, further comprising: a filler placed between an upper surface of the battery block and a lower surface of the cover and bringing the battery block into close contact with a bottom surface of the case.

11. The thin film battery package according to claim 2, further comprising:
   a filler placed between an upper surface of the unit cell and a lower surface of the cover and configured to bring the unit cell into close contact with a bottom surface of the case.

12. The thin film battery package according to claim 3, wherein a filler is provided to the battery block, an inner bottom surface of the case and an inner side surface of the case, and prevents the battery block from being moved by external impact.

13. The thin film battery package according to claim 2, further comprising:
   a filler provided to the unit cell, an inner bottom surface of the case and an inner side surface of the case, the filler configured to prevent the battery block from being moved by external impact.

14. The thin film battery package according to claim 3, wherein the unit cells constituting the battery block are stacked along an inner wall of the internal space and are electrically connected to one another by coating layers of paste applied to the respective terminals.

15. The thin film battery package according to claim 3, wherein the first and second terminals of the unit cell are electrically connected to the respective first and second electrodes of the case by coating layers of paste.

16. The thin film battery package according to claim 1, wherein the cover further comprises an auxiliary cover extending from a lower end of the cover by a predetermined thickness to be inserted into an opening of the internal space.

17. The thin film battery package according to claim 1, wherein the portion has a pin shape.

18. The thin film battery package according to claim 1, wherein the portion has a pad shape.

\* \* \* \* \*